(12) United States Patent
Jung et al.

(10) Patent No.: US 7,796,599 B2
(45) Date of Patent: Sep. 14, 2010

(54) MULTIPLEXING AND DEMULTIPLEXING APPARATUS FOR DELIVERING MPEG-2 TS PACKET ERROR SIGNAL THROUGH CABLECARD INTERFACE AND MULTIPLEXING AND DEMULTIPLEXING METHOD USING THE SAME

(75) Inventors: Joon-Young Jung, Daejon (KR);
O-Hyung Kwon, Deajon (KR); Soo-In Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 519 days.

(21) Appl. No.: 11/525,766

(22) Filed: Sep. 22, 2006

(65) Prior Publication Data

US 2007/0133541 A1    Jun. 14, 2007

(30) Foreign Application Priority Data

Dec. 9, 2005    (KR) .................. 10-2005-0121053

(51) Int. Cl.
*H04L 12/56* (2006.01)
(52) U.S. Cl. .................................................... 370/392
(58) Field of Classification Search .............. 370/351, 370/389, 392, 468; 375/240; 714/764; 710/20
See application file for complete search history.

(56) References Cited

U.S. PATENT DOCUMENTS 7,257,763 B1 * 8/2007 Srinivasan et al. .......... 714/764

| | | | |
|---|---|---|---|
| 2002/0024970 A1 * | 2/2002 | Amaral et al. | 370/468 |
| 2002/0078118 A1 * | 6/2002 | Cone et al. | 709/101 |
| 2005/0175178 A1 * | 8/2005 | Candelore et al. | 380/201 |
| 2006/0159094 A1 * | 7/2006 | Gummalla et al. | 370/390 |
| 2006/0184702 A1 * | 8/2006 | Yeh | 710/20 |
| 2008/0025389 A1 * | 1/2008 | Markman et al. | 375/240.02 |

FOREIGN PATENT DOCUMENTS

| KR | 1019990023207 | 3/1999 |
|---|---|---|
| KR | 1020030012593 | 2/2003 |
| KR | 1020050055950 | 6/2006 |

OTHER PUBLICATIONS

"Multi-Stream Cable CARD Interface, OC-SP-MC-IF-C01-050331" *CableLabs* Mar. 31, 2005.

* cited by examiner

*Primary Examiner*—Dang T Ton
*Assistant Examiner*—Kevin Lee
(74) *Attorney, Agent, or Firm*—Blakely, Sokoloff, Taylor & Zafman (57) ABSTRACT

Provided are a multiplexing and demultiplexing apparatus and method for delivering an MPEG-2 TS packet error signal through a CableCARD interface. In the multiplexing apparatus, a TS packet reception unit receives TS packets, and a pre-header generation unit generates pre-headers corresponding to the received TS packets. A pre-header insertion unit inserts the pre-headers in front of the received TS packets to generate cable MPEG packets (CMPs), and an output FIFO unit stores the CMPs. A FIFO control unit transfers the CMPs without collision with CMPS of different channels, and an output signal generation unit generates output signals from the CMPs of the different channels.

8 Claims, 7 Drawing Sheets

MULTIPLEXING AND DEMULTIPLEXING APPARATUS FOR DELIVERING MPEG-2 TS PACKET ERROR SIGNAL THROUGH CABLECARD INTERFACE AND MULTIPLEXING AND DEMULTIPLEXING METHOD USING THE SAME

FIELD OF THE INVENTION

The present invention relates to a multiplexing and demultiplexing apparatus and method for delivering an MPEG-2 TS packet error signal through a CableCARD interface. A demodulator of a receiver processes error information of an MPEG-2 TS packet through an interface with CableCARD™ for a conditional access to a digital cable TV receiver or set-top terminal based on OpenCable™ standard, and the MPEG-2 TS packet error signal is delivered to a decoder through a CableCard Interface.

DESCRIPTION OF RELATED ART

Generally, a digital cable TV receiver includes a demodulator and a decoder. The demodulator processes an RF broadcasting signal into Moving Picture Experts Group-2 (MPEG-2) transport stream (TS) packet format, and the decoder decodes the TS packet into audio/video (A/V) data.

The broadcasting signal is a Quadrature Amplitude Modulation (QAM) signal generated based on International Telecommunication Union (ITU)-T J.83 specification.

Figure 1:
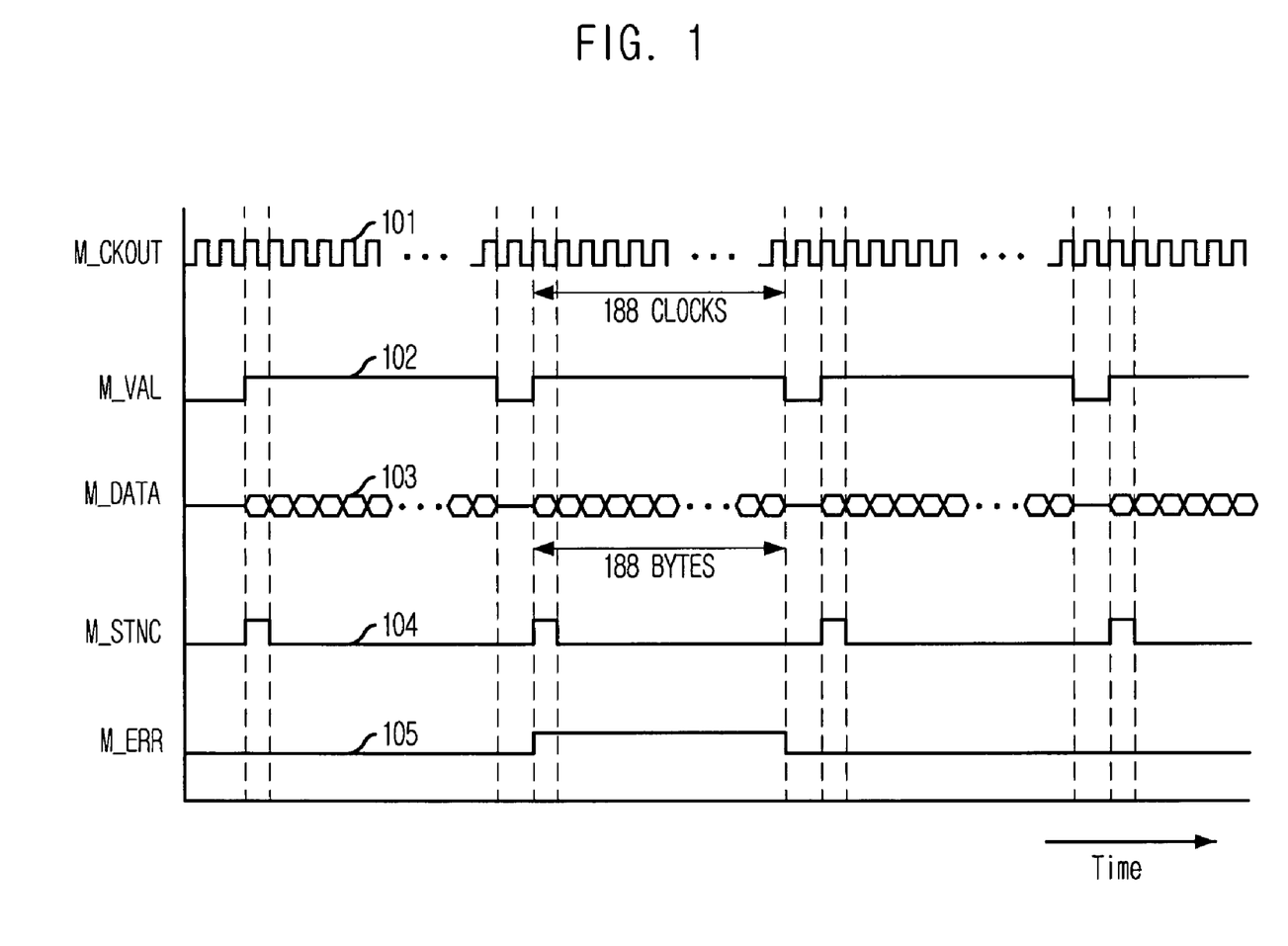
FIG. 1 is a timing diagram of signals outputted from a demodulator of a general digital cable TV receiver.

FIG. 1 is a waveform diagram illustrating output signals of a demodulator in a general digital cable TV receiver.

The demodulator 215 of the cable TV receiver demodulates a received QAM signal to output a total 12-bit signal: 1-bit data output clock (M_CKOUT) 101, 1-bit valid data output indication signal (M_VAL) 102, 8-bit MPEG-2 TS packet data (M_DATA) 103, 1-bit sync byte output indication signal 104 of the TS packet, and 1-bit TS packet error signal (M_ERR) 105.

A decoder decodes the 12-bit signal into A/V data. The TS packet error signal 105 is not directly associated with the A/V data recovery. However, the quality of the A/V data can be improved by applying the TS packet error signal to an error control scheme such as error concealment or error recovery.

In the OpenCable™ standard, a conditional access module is separated from a digital cable TV receiver and an interface for the conditional access module is defined.

The conditional access module is called a CableCARD™, and the interface specification between the receiver and the CableCARD was announced.

An existing receiver has a function of receiving and processing a single channel. In recent years, however, there is a demand for a function that can simultaneously receive multiple broadcasting channels. Therefore, the OpenCable™ standard defines an interface between the CableCARD and the cable broadcasting receiver that can simultaneously receive multiple broadcasting channels.

The CableCARD interface for the receiver that processes a single channel is defined as "S-Mode", and the CableCARD interface of the receiver that processes multiple channels is defined as "M-Mode".

Figure 2:
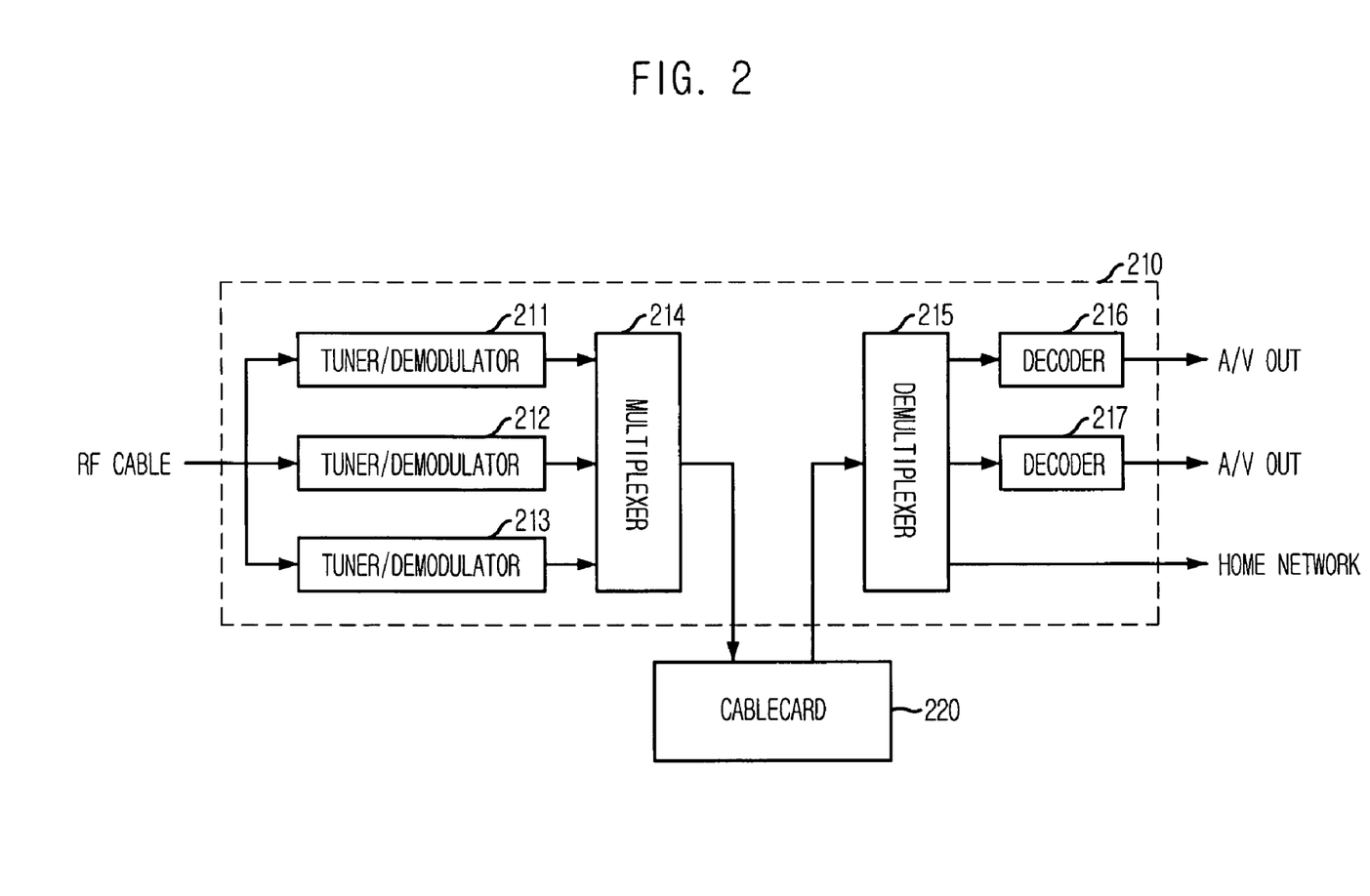
FIG. 2 is a block diagram of a general cable broadcasting receiver and a CableCARD.

FIG. 2 is a block diagram illustrating an interface between a CableCARD and a general cable broadcasting receiver that can simultaneously receive multiple broadcasting channels.

Tuners/demodulators 211, 212 and 213 of the cable broadcasting receiver 210 simultaneously receive/demodulate multiple broadcasting channels and output broadcasting streams (MPEG-2 transport streams).

The broadcasting streams are multiplexed by a multiplexer 214 and are inputted to the CableCARD 220 for a conditional access process.

The CableCARD 220 descrambles the multiplexed broadcasting streams according to a control signal. Then, a demultiplexer 215 of the cable broadcasting receiver 210 demultiplexes the descrambled broadcasting streams into the respective broadcasting streams. The broadcasting streams are outputted to MPEG decoders 216 and 217 and a home network.

A physical interface between the cable broadcasting receiver 210 of FIG. 2 and the CableCARD 220 uses a 68-pin Personal Computer Memory Card International Association (PCMCIA) card interface, but signals allocated to the respective pins are based on the OpenCable specification. Input/output (I/O) interface related to the broadcasting stream (MPEG-2 TS) defines only 10 pins.

1-bit data I/O clock, 1-bit packet start signal, and 8-bit packet data are inputted/outputted through the 10-pin interface. A transmitted packet data format is a 200-byte CableCARD MPEG Packet (CMP) in which a 12-byte pre-header is added to 188-byte MPEG-2 TS packet.

The 12-byte pre-header is defined so as to distinguish the broadcasting streams of the different channels when the multiplexer 214 of the cable broadcasting receiver 210 receives the broadcasting streams of the multiple channels and generates one multiplexed broadcasting stream.

Figure 3:
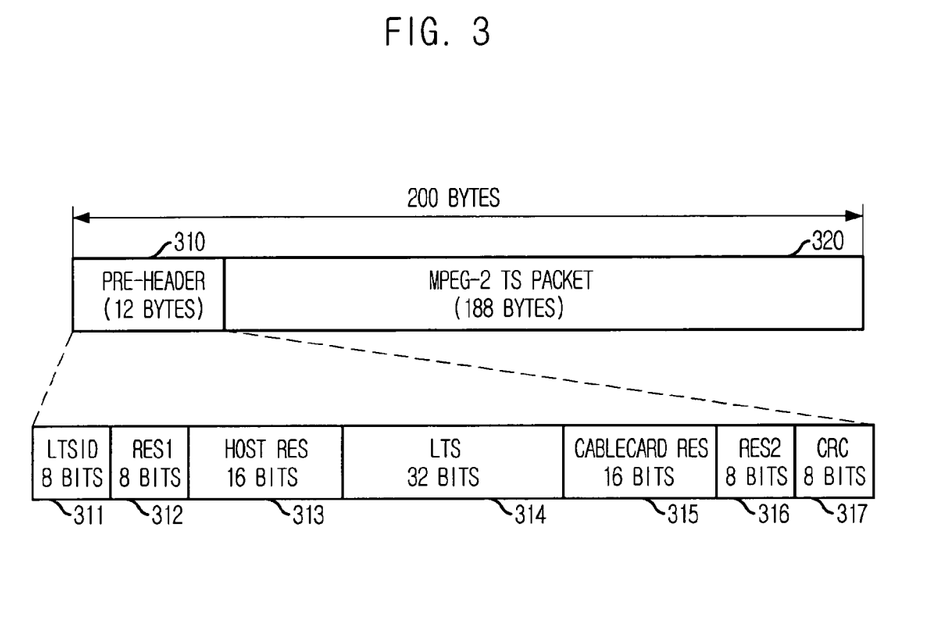
FIG. 3 shows a 12-byte pre-header in a general cable broadcasting receiver.

FIG. 3 shows the 12-byte pre-header in the general cable broadcasting receiver. The definitions of the respective fields of the 12-byte pre-header are as follows.

A Local Transport Stream ID (LTSID) field 311 is used as an identifier that can identify the broadcasting streams of the respective channels. That is, the LTSID field 311 has different values in the broadcasting streams of the different channels.

An RES1 field 312 and an RES2 field 316 are a reserved field for a future use and have "0x00" basically.

A HOST_reserved field 313 is a 16-bit field that can be used for arbitrary purposes at the receiver.

A Local Time Stamp (LTS) 314 is a 32-bit field allocated by the receiver and may be used for MPEG timing management.

A CableCARD_reserved field 315 is a 16-bit field that can be used for arbitrary purposes at the CableCARD.

A Cycle Redundancy Check (CRC) field 317 is an 8-bit field used to determine whether values of the pre-header 310 are changed after passing through the CableCARD.

Figure 4:
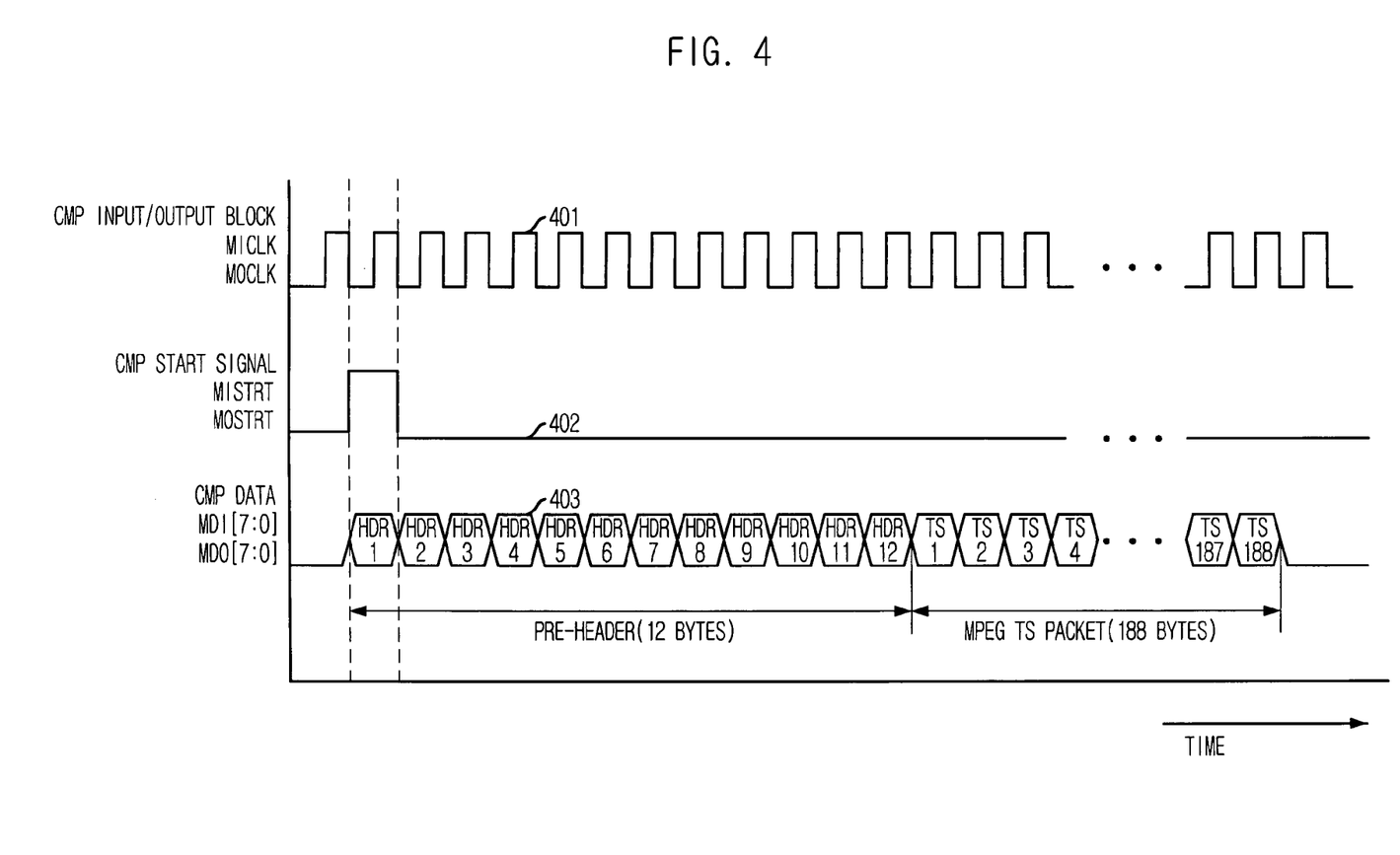
FIG. 4 is a timing diagram illustrating input/output of a multiplexed CMP through a CableCARD interface.

FIG. 4 is a timing diagram illustrating input/output of the multiplexed CMP through the CableCARD interface. Specifically, FIG. 4 illustrates the signals inputted/outputted to/from the CableCARD through 10 pins.

Compared with the output signals of the demodulator 215 of FIG. 1, the CMP I/O clock 401 is similar to the data output clock 101, the CMP start signal 402 corresponds to the sync byte output indication signal 104 of the TS packet. Also, the CMP data 403 corresponds to the MPEG-2 TS packet data 103.

The valid data output indication signal 102 is associated with the packet data and may be analogized as the CMP start signal 402. However, a pin for transferring the TS packet error signal 105 through the CableCARD interface is not allocated.

Therefore, there is a demand for an apparatus and method that can deliver the packet error information generated in the demodulator to the decoder through the CableCARD interface.

SUMMARY OF THE INVENTION

It is, therefore, an object of the present invention to provide a multiplexing and demultiplexing apparatus and method for delivering an MPEG-2 TS packet error signal through a CableCard interface. A demodulator of a receiver processes error information of an MPEG-2 TS packet through an interface with CableCARDTM for a conditional access to a digital cable TV receiver or set-top terminal based on OpenCableT™ standard, and the MPEG-2 TS packet error signal is delivered to a decoder through a CableCard Interface.

In accordance with an aspect of the present invention, there is provided a multiplexing apparatus for delivering MPEG-2 transport stream (TS) packet error signal through a Cable-CARD interface, including: a TS packet reception unit for receiving TS packets; a pre-header generation unit for generating pre-headers corresponding to the received TS packets; a pre-header insertion unit for inserting the pre-headers in front of the received TS packets to generate cable MPEG packets (CMPS); an output FIFO unit for storing the CMPs; a FIFO control unit for transferring the CMPs without collision with CMPS of different channels; and an output signal generation unit for generating output signals from the CMPs of the different channels.

In accordance with another aspect of the present invention, there is provided a demultiplexing apparatus for delivering MPEG-2 TS packet error signal through a CableCARD interface, including: a local transport stream identification (LTSID) check unit for receiving CMPs from a CableCARD and checking an LTSID field value of a pre-header to classify the CMPs according to channels; an input FIFO unit for storing the classified CMPs; a pre-header check unit for performing a CRC check for integrity inspection of the pre-headers of the stored CMPS; a packet timing correction unit for comparing a current local time stamp (LTS) value with an LTS field value recorded when a multiplexer generates the pre-header, and correcting timing information of the TS packet; a pre-header removal unit for removing the pre-header from the CMP whose packet timing is corrected by the packet timing correction unit, and generating MPEG-2 TS packet as a final output data format; and a packet error signal generation unit for checking a packet error flag, which is set by the multiplexer, in HOST_reserved field of the pre-header removed by the pre-header removal unit, and generating a packet error signal indicating whether an error occurs in the MPEG-2 TS packet.

In accordance with further aspect of the present invention, there is provided a multiplexing method for delivering MPEG-2 TS packet error signal through a CableCARD interface, including the steps of: receiving TS packets from a TS packet reception block; generating pre-headers corresponding to the received TS packets; inserting the pre-headers in front of the received TS packets to generate CMPs, and storing the CMPs in an output FIFO block; and transferring the CMPs to an output signal generation block without collision with CMPS of different channels under control of a FIFO control block, and generating final output signals from the CMPs of the different channels.

In accordance with still further aspect of the present invention, there is provided a demultiplexing method for delivering MPEG-2 TS packet error signal through a CableCARD interface, including the steps of: at a local LTSID check block, receiving CMPs from a CableCARD and checking an LTSID field value of a pre-header to classify the CMPs according to channels; storing the classified CMPs in an input FIFO block, transferring the classified CMPs to a pre-header check block, performing a CRC check for integrity inspection of the pre-headers, and outputting the checked CMPs to the packet timing correction block; at the packet timing correction block, comparing a current local time stamp (LTS) value with an LTS field value recorded when a multiplexer generates the pre-header, and correcting timing information of the TS packet; at a pre-header removal block, removing the pre-header from the CMP whose packet timing is corrected by the packet timing correction block, and generating the MPEG-2 TS packet as a final output data format; and inputting the removed pre-header to a packet error signal generation unit, checking a packet error flag, which is set by a multiplexer, in a "HOST_reserved" field of the pre-header, and generating a packet error signal indicating whether an error occurs in the MPEG-2 TS packet.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 5:
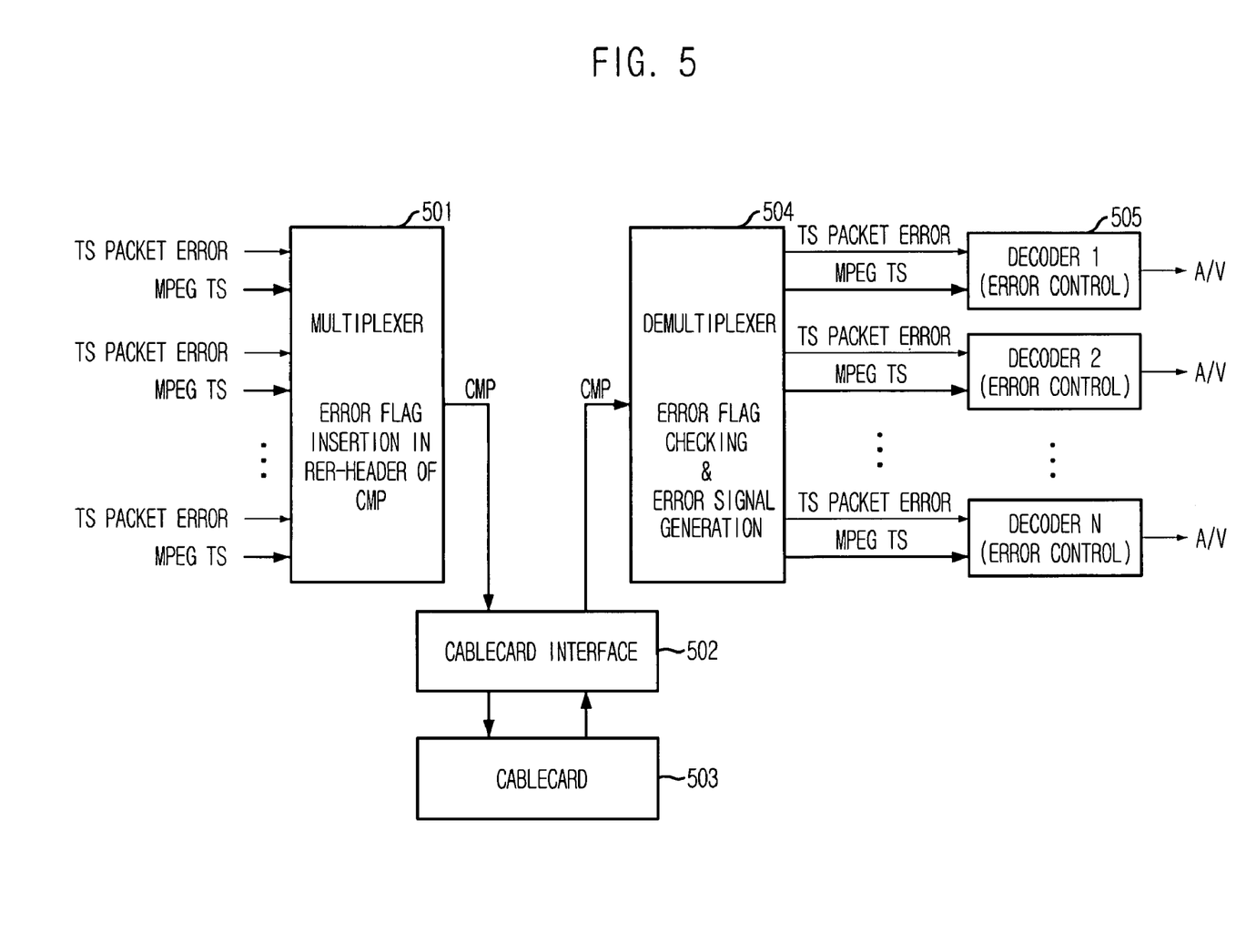
FIG. 5 is a block diagram of a multiplexing and demultiplexing apparatus for delivering an MPEG-2 TS packet error signal through a CableCARD interface in accordance with an embodiment of the present invention.

FIG. 5 is a block diagram of a multiplexing and demultiplexing apparatus for delivering an MPEG-2 TS packet error signal through a CableCARD interface in accordance with an embodiment of the present invention.

In accordance with the present invention, a packet error signal generated from a demodulator is delivered through a CableCARD interface to a decoder by using 1 bit of the 16-bit HOST_reserved field 313 of the pre-header of FIG. 3 as a packet error flag.

Referring to FIG. 5, broadcasting streams (MPEG-2 TS) received/modulated at channels are inputted to a multiplexer 501. In generating CMP-type multiplexed streams into which 12-byte pre-header is inserted, the multiplexer 501 receives a packet error signal from a demodulator and sets packet error flag values to the HOST_reserved field 313 of the packet pre-header when the pre-header of the TS packets is generated.

The CMP-type multiplexed streams are inputted to a CableCARD 503 through a CableCARD interface 502. A conditional access process is performed on the inputted streams and outputted to a demultiplexer 504. The demultiplexer 504 demultiplexes the inputted streams based on the 12-bit pre-header to separate the broadcasting streams according to the respective channels. In addition, the packet error signals are generated by checking the packet error flag values at the HOST_reserved field 313 of the corresponding packet pre-header. In this manner, the decoders 505 can perform the error control such as error concealment or error recovery by using the packet error signals.

Figure 6:
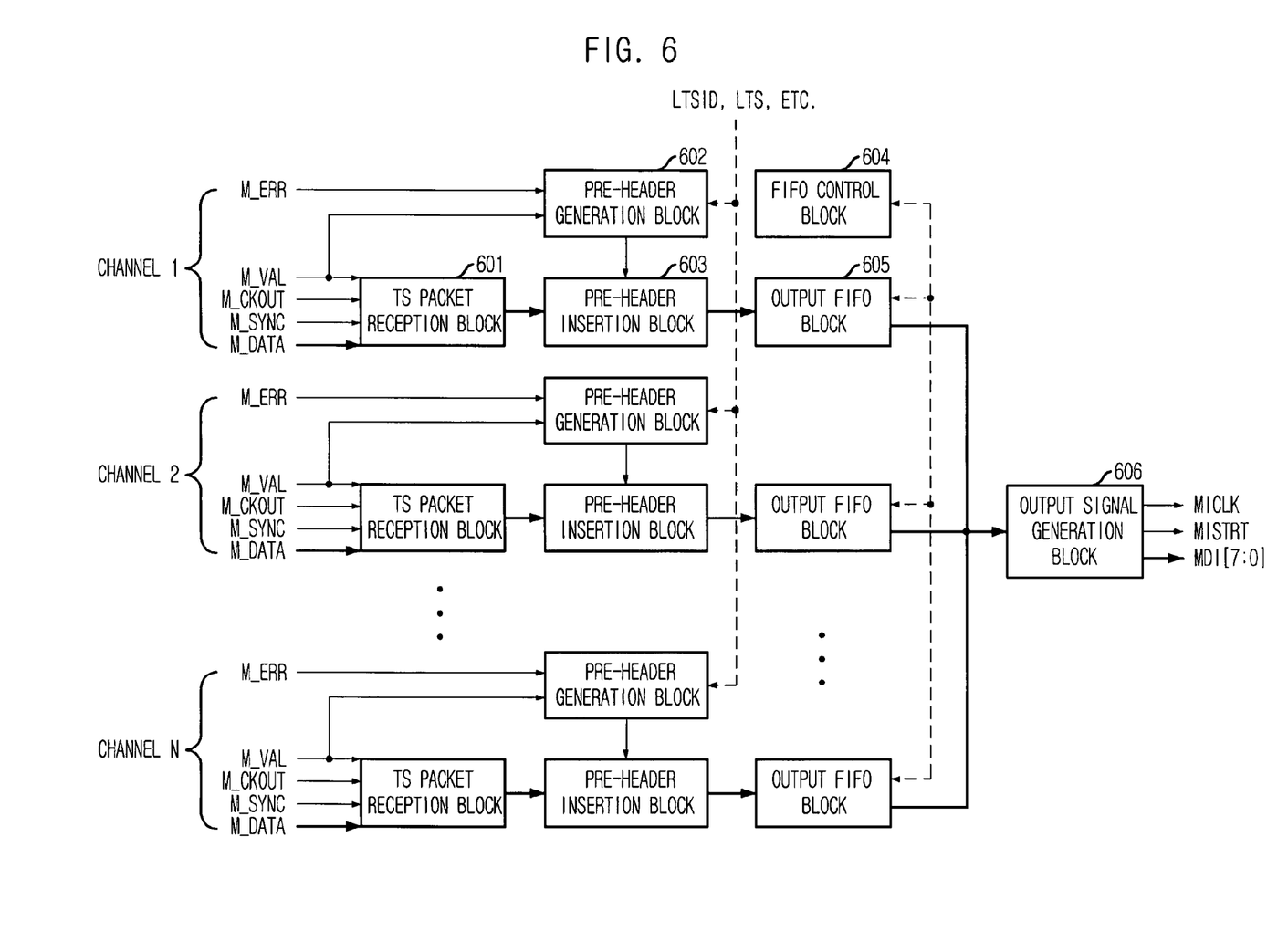
FIG. 6 is a block diagram of a multiplexing apparatus and method for delivering the MPEG-2 TS packet error signal through a CableCARD interface in accordance with the embodiment of the present invention.

FIG. 6 is a block diagram of a multiplexing apparatus and method for delivering the MPEG-2 TS packet error signal through the CableCARD interface in accordance with the embodiment of the present invention.

The multiplexing apparatus includes a TS packet reception block 601 for receiving TS packets, a pre-header generation block 602 for generating pre-headers corresponding to the received TS packets, a pre-header insertion block 603 for inserting the pre-headers in front of the received TS packets to generate CMPS, a FIFO block 605 for storing the CMP, a FIFO control block 604 for transferring the CMPs to the output signal generation block 606 without collision with the CMPs of the different channels, and an output signal generation block 606 for generating output signals from the CMPs received from the channels.

When the output signals of the demodulators of the respective channels are inputted to the multiplexer as shown in FIG. 6, 1-bit data clock (M_CKOUT), 1-bit valid data indication signal (M_VAL), 8-bit MPEG-2 TS packet data (M_DATA), and 1-bit sync byte output indication signal (M_SYNC) of the TS packet are transferred to the TS packet reception block 601 and used to receive the MPEG-2 TS packet. 1-bit valid data indication signal (M_VAL) and TS packet error signal (M_ERR) are inputted to the pre-header generation block 602 and used to set the packet error flag values to the HOST_reserved field 313 of the pre-header when the pre-header is generated.

Because the values of the LTSID field 311 and the LTS field 314 in the pre-header are determined by a control module of the receiver, their detailed description will be omitted.

In the 16-bit HOST_reserved field 313, the 1-bit packet error flag can be located at any position. The demultiplexer has only to know which bit of the HOST_reserved field 313 the packet error flag is located in.

As described above, the multiplexer receives the TS packet from the TS packet reception block 601 and generates the pre-header corresponding to the TS packet received from the pre-header generation block 602.

After the pre-header is generated, the pre-header insertion block 603 inserts the pre-header in front of the received TS packet to generate the CMP. Then, the CMP is outputted to the FIFO block 605.

The CMP is stored in the output FIFO block 605. Under control of the FIFO control block 604, the CMP is transferred to the output signal generation block 606 without collision with the CMPs of the different channels.

The output signal generation block 606 receives the CMPs from the respective channels and generates the signals of FIG. 4.

On the other hand, the demultiplexer receives the conditional-access-processed CMPs through the CableCARD in the format of FIG. 5.

Figure 7:
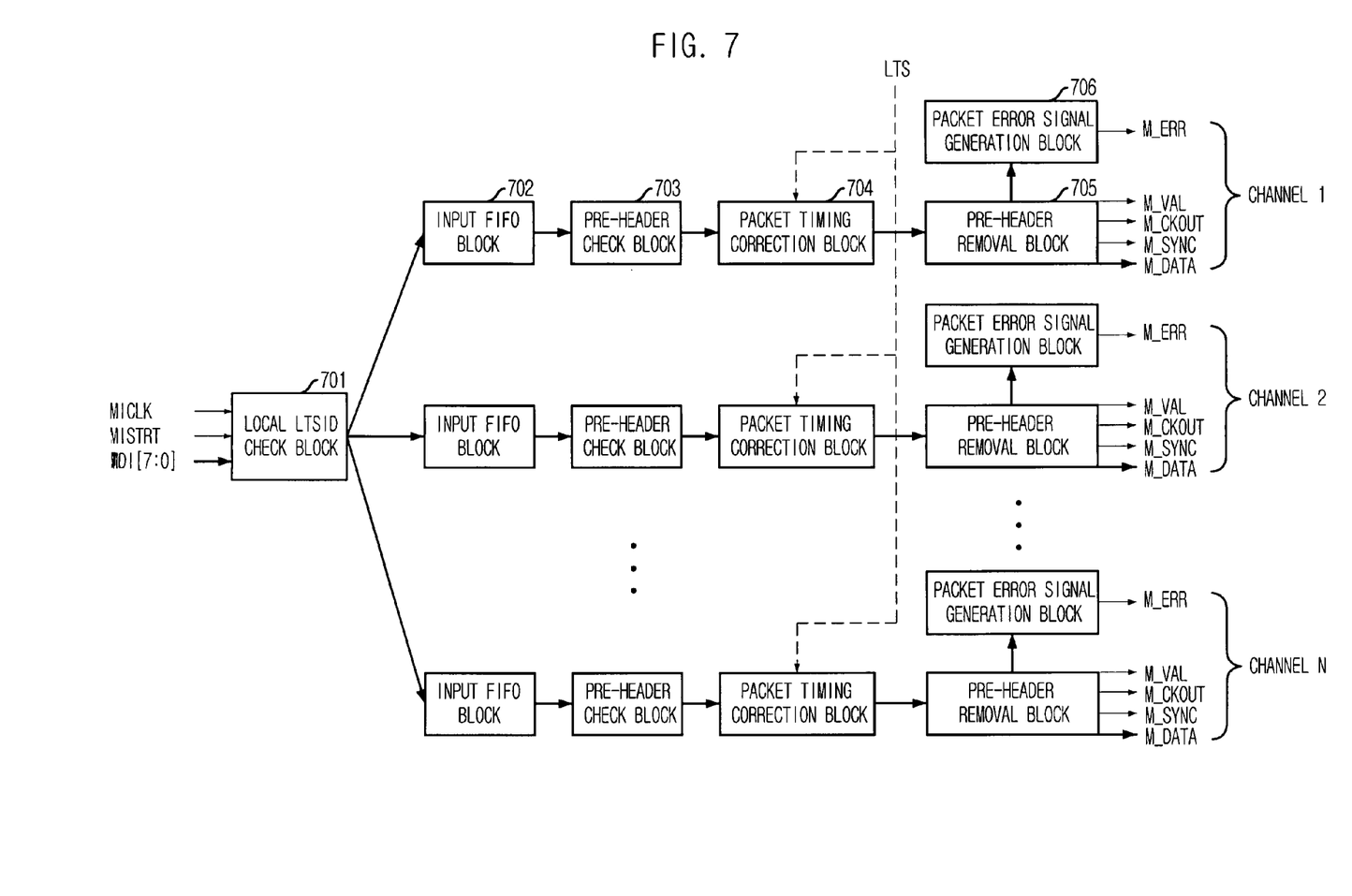
FIG. 7 is a block diagram of a demultiplexing apparatus and method for delivering the MPEG-2 TS packet error signal through the CableCARD interface in accordance with the embodiment of the present invention.

FIG. 7 is a block diagram of a demultiplexing apparatus and method for delivering the MPEG-2 TS packet error signal through the CableCARD interface in accordance with the embodiment of the present invention. When the broadcasting streams of the respective channels are demultiplexed and outputted to the corresponding decoder, the packet error signal can also be generated and outputted to the decoder.

Referring to FIG. 7, the demultiplexing apparatus includes a local LTSID check block 701, an input FIFO block 702, a pre-header check block 703, a packet timing correction block 704, a pre-header removal block 705, and a packet error signal generation block 706.

The local LTSID check block 701 receives the CMPs from the CableCARD and checks the value of the LTSID field 311 of the pre-header to classify the CMPs according to the channels. The input FIFO block 702 stores the classified CMPs. The pre-header check block 703 checks the pre-header and other setting-related parts. For example, the pre-header check block 703 performs a CRC check for integrity inspection. The packet timing correction block 704 compares a current LTS value with the LTS field (314) value recorded when the multiplexer generates the pre-header, and corrects timing information of the TS packet. The pre-header removal block 705 removes the pre-header from the CMP whose packet timing is corrected by the packet timing correction block 704, and generates the MPEG-2 TS packet as the final output data format. The packet error signal generation block 706 checks the packet error flag, which is set by the multiplexer, in the HOST_reserved field 313 of the pre-header removed by the pre-header removal block 705, and generates the packet error signal indicating whether an error occurs in the MPEG-2 TS packet.

In the demultiplexer of FIG. 7, the packet error signals for the TS packet streams outputted to the corresponding decoders are generated using the packet error flag of the pre-header set by the multiplexer.

A demultiplexing method in accordance with the present invention will be described below.

The CMPs from the CableCARD are inputted to the local LTSID check block 701. The value of the LTSID field 311 of the pre-header is checked to classify the CMPs according to the channels.

The classified CMPs are stored in the input FIFO blocks 702 of the corresponding channels and transferred to the pre-header check block 703. The pre-header check block 703 checks the pre-header and other setting-related parts. For example, the pre-header check block 703 performs a CRC check for integrity inspection. Then, the CMPs are transferred to the packet timing correction block 704.

The packet timing correction block 704 compares a current LTS value with the LTS field (314) value recorded when the multiplexer generates the pre-header, and corrects timing information of the TS packet.

A detailed description about the timing correction of the TS packet will be omitted for conciseness.

The pre-header removal block 705 removes the pre-header from the CMP whose packet timing is corrected by the packet timing correction block 704, and generates the MPEG-2 TS packet as the final output data format. At this point, the pre-header is inputted to the packet error signal generation block 706. The packet error signal generation block 706 checks the packet error flag, which is set by the multiplexer, in the HOST_reserved field 313 of the pre-header, and generates the packet error signal indicating whether an error occurs in the MPEG-2 TS packet. Therefore, the demultiplexer generates the same output signals as the output signals of the demultiplexer of FIG. 1, including the TS packet error signal.

As described above, when the demultiplexer outputs the broadcasting streams with the TS packet error signal to the decoders corresponding to the respective channels, the decoders applies the error control scheme, such as error concealment or error recovery, by using the TS packet error signal. Consequently, the quality of A/V data outputted from the decoders can be improved.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

The present application contains subject matter related to Korean patent application No. 2005-0121053, filed in the Korean Intellectual Property Office on Dec. 9, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A multiplexing apparatus for delivering an MPEG-2 transport stream (TS) packet error signal through a Cable-CARD interface, comprising:
 a TS packet reception unit for receiving TS packets;
 a pre-header generation unit for generating pre-headers corresponding to the received TS packets;
 a pre-header insertion unit for inserting the pre-headers in front of the received TS packets to generate cable MPEG packets (CMPs), the pre-headers including an indication of the MPEG-2 TS packet error signal;
 an output FIFO unit for storing the CMPs;
 a FIFO control unit for transferring the CMPs to an output signal generation unit without collision with CMPs of different channels; and
 the output signal generation unit for generating output signals from the CMPs of the different channels,
 wherein the multiplexing apparatus receives a TS packet and the MPEG-2 TS packet error signal from a demodulator, and outputs the CMPs to the CableCARD interface, the CMPs incorporating the MPEG-2 TS packet error signal into a HOST reserved field of a pre-header of the CMPs,
 the pre-header generation unit receives a 1-bit valid data indication signal (M_VAL) from a first dedicated bit line and the MPEG-2 TS packet error signal from a second dedicated bit line to set a packet error flag value in the pre-header, the pre-header including the packet error flag value is transmitted by the output signal generation unit on shared bit lines, none of which is dedicated to transmission of the packet error flag value.

2. The multiplexing apparatus as recited in claim 1, wherein the TS packet reception unit receives 1-bit data clock (M_CKOUT), the 1-bit valid data indication signal (M_VAL), 8-bit MPEG-2 TS packet data (M_DATA), and 1-bit sync byte output indication signal (M_SYNC) of each TS packet.

3. The multiplexing apparatus as recited in claim 1, wherein the pre-header generation unit receives the 1-bit valid data indication signal (M_VAL) and the MPEG-2 TS packet error signal, which are used to set the packet error flag value in a "HOST reserved" field of a pre-header when the pre-header is generated.

4. The multiplexing apparatus as recited in claim 1, wherein a "HOST_reserved" field of the pre-header has 16-bit size, 1-bit packet error flag being locatable at any position, and a demultiplexer has only to know which bit of the HOST_reserved field the packet error flag value is located in.

5. A demultiplexing apparatus for delivering an MPEG-2 transport stream (TS) packet error signal through a Cable-CARD interface, comprising:
 a local transport stream identification (LTSID) check unit for receiving a CMP from a CableCARD and checking an LTSID field value of a pre-header of the CMP to classify the CMP according to channels, wherein the CMP includes the pre-header and an MPEG-2 TS packet, which are transmitted from the CableCARD on shared bit lines, none of which is dedicated to transmission of a packet error flag that indicates whether an error occurs in the MPEG-2 TS packet;
 an input FIFO unit for storing the classified CMP;
 a pre-header check unit for performing a CRC check for integrity inspection of the pre-headers of the stored CMP;
 a packet timing correction unit for comparing a current local time stamp (LTS) value with an LTS field value recorded when a multiplexer generates the pre-header, and correcting timing information of the MPEG-2 TS packet;
 a pre-header removal unit for removing the pre-header from the CMP whose packet timing is corrected by the packet timing correction unit, and generating the MPEG-2 TS packet as a final output data format; and
 a packet error signal generation unit for checking the packet error flag, which is set by the multiplexer, in a HOST_reserved field of the pre-header removed by the pre-header removal unit, and generating the MPEG-2 TS packet error signal on a dedicated output line to indicate whether an error occurs in the MPEG-2 TS packet,
 wherein the demultiplexing apparatus receives the CMP from the CableCARD interface and outputs the MPEG-2 TS packet and the MPEG-2 TS packet error signal to a decoder, the CMP incorporating the MPEG-2 TS packet error signal into the HOST reserved field of the pre-header of the CMP.

6. A multiplexing method for delivering an MPEG-2 transport stream (TS) packet error signal through a CableCARD interface, comprising the steps of:
 receiving TS packets from a TS packet reception block;
 generating pre-headers corresponding to the received TS packets;
 inserting the pre-headers in front of the received TS packets to generate cable MPEG packets (CMPs), and storing the CMPs in an output FIFO block, the pre-headers including an indication of the MPEG-2 TS packet error signal; and
 transferring the CMPs to an output signal generation block without collision with CMPs of different channels under control of a FIFO control block, and generating final output signals from the CMPs of the different channels,
 wherein generating the pre-headers further comprises:
 receiving a TS packet and the MPEG-2 TS packet error signal from a demodulator, and outputting the CMPs to the CableCARD interface, the CMPs incorporating the MPEG-2 TS packet error signal into a HOST_reserved field of a pre-header of the CMPs,
 receiving a 1-bit valid data indication signal (M_VAL) from a first dedicated bit line and the MPEG-2 TS packet error signal from a second dedicated bit line to set a packet error flag value in the pre-header, the pre-header including the packet error flag value being transmitted by the output signal generation block on shared bit lines, none of which is dedicated to transmission of the packet error flag value.

7. The multiplexing method as recited in claim 6, wherein the final output signals include a CMP I/O clock, a CMP start signal, and CMP data.

8. A demultiplexing method for delivering an MPEG-2 transport stream (TS) packet error signal through a Cable-CARD interface, comprising the steps of:
   at a local LTSID check block, receiving a cable MPEG packets (CMP) from a CableCARD and checking an LTSID field value of a pre-header of the CMP to classify the CMP according to channels, wherein the CMP includes the pre-header and an MPEG-2 TS packet, which are transmitted from the CableCARD on shared bit lines, none of which is dedicated to transmission of a packet error flag value that indicates whether an error occurs in the MPEG-2 TS packet;
   storing the classified CMP in an input FIFO block, transferring the classified CMPs to a pre-header check block, performing a CRC check for integrity inspection of the pre-header, and outputting the checked CMP to a packet timing correction block;
   at the packet timing correction block, comparing a current local time stamp (LTS) value with an LTS field value recorded when a multiplexer generates the pre-header, and correcting timing information of the MPEG-2 TS packet;
   at a pre-header removal block, removing the pre-header from the CMP whose packet timing is corrected by the packet timing correction block, and generating the MPEG-2 TS packet as a final output data format; and
   inputting the removed pre-header to a packet error signal generation unit, checking the packet error flag value, which is set by the multiplexer, in a "HOST_reserved" field of the pre-header, and generating the MPEG-2 TS packet error signal on a dedicated output line to indicate whether an error occurs in the MPEG-2 TS packet,
   wherein the demultiplexing method further comprising:
   receiving the CMP from the CableCARD interface and outputting the MPEG-2 TS packet and the MPEG-2 TS packet error signal to a decoder, the CMP incorporating the MPEG-2 TS packet error signal into the HOST_reserved field of the pre-header of the CMP.

\* \* \* \* \*